United States Patent [19]
Ford

[11] Patent Number: 6,027,786
[45] Date of Patent: Feb. 22, 2000

[54] COMPOSITE MATERIALS AND METHOD FOR MAKING THEM

[76] Inventor: Roger A Ford, 10 Hay Barn Meadow, Woolpit, Bury St. Edmunds, Suffolk IP30 9TU., United Kingdom

[21] Appl. No.: 08/765,054

[22] PCT Filed: Jun. 30, 1995

[86] PCT No.: PCT/GB95/01530

§ 371 Date: Apr. 21, 1997

§ 102(e) Date: Apr. 21, 1997

[87] PCT Pub. No.: WO96/01177

PCT Pub. Date: Jan. 18, 1996

[30] Foreign Application Priority Data

Jul. 4, 1994 [GB] United Kingdom .................. 9413417

[51] Int. Cl.[7] ............................... B32B 3/10; B32B 31/24
[52] U.S. Cl. .......................... 428/137; 156/242; 156/252; 428/220; 428/295.4
[58] Field of Search ................................. 156/242, 252; 428/137, 220, 295.4

[56] References Cited

U.S. PATENT DOCUMENTS 4,990,207  2/1991  Sakai et al. .............................. 156/242

5,047,281  9/1991  Betz et al. .............................. 428/201

FOREIGN PATENT DOCUMENTS

| 0408291 | 1/1991 | European Pat. Off. . |
| 0489243 | 6/1992 | European Pat. Off. . |
| 1384835 | 12/1965 | France . |
| 2633213 | 12/1989 | France . |

*Primary Examiner*—Jenna Davis
*Attorney, Agent, or Firm*—Pillsbury Madison & Sutro LLP

[57] ABSTRACT

New fiber-reinforced composite materials of improved moldability and methods for making them, in which an initial material comprising long length ("continuous filament") reinforcement set in a matrix material is treated to enable these filaments to be severed in situ into fibers of smaller length while maintaining a control over the length and location of these resulting shortened fibers while preserving the orientation desired to give strength to the materials. The severance is preferably achieved using radiant energy from a laser or the like, and most conveniently by using a laser to make a series or pattern of perforations (usually 0.5 mm or less in diameter) so that the reinforcing filaments are attacked but the surrounding matrix material is not appreciably affected or weakened. The treated materials can be used to fabricate larger products or articles of wide variety, by further processing, especially molding or thermoforming.

14 Claims, 1 Drawing Sheet

COMPOSITE MATERIALS AND METHOD FOR MAKING THEM

This application is the national phase of international application PCT/GB95/01530 filed Jun. 30, 1995 which designated the U.S.

This invention relates to improved composite materials with improved mouldability and methods for making them, and more particularly to the improvement of composite materials which can be shaped by rapid thermo-forming from semi-finished materials such as sheet, rod and tube.

It is common practice to reinforce materials by incorporating in them a reinforcing material in the form of lengths of fibre or continuous filament. Further, to increase the effect of such reinforcement, it is common to align the reinforcing fibres or filaments so that they give the composite an extra improvement in a selected direction, substantially in the direction of the alignment. Moreover, if highly reinforced materials are required, a high degree of alignment is a necessary condition for achieving the desired level of fibre content, which normally involves using the reinforcement in continuous form.

If attempts are made to form deeply drawn three-dimensional articles from composite materials which are reinforced with continuous filaments, severe fibre disturbance and even breakage can occur because of the minimal extensibility in the direction of the reinforcement.

This problem can be potentially overcome if the continuous filaments are replaced by discontinuous fibres, but there are problems in aligning discontinuous fibres to the high level which can be achieved when continuous filaments are used.

One method is disclosed in GB. Patent No. 1,389,539, where chopped fibres are dispersed in a viscous medium such as glycerol and subsequently aligned by subjecting the medium to convergent laminar flow conditions prior to depositing the fibres on a suitable filter bed. Another method is disclosed in U.S. Pat. Nos. 4,552,805 and 4,759,985 where a tow of reinforcing filaments is converted into a cohesive sliver of stretch-broken fibres which can subsequently be collimated and impregnated. However, in both cases there is some loss of control over fibre alignment, and this can limit the level of fibre volume fraction and material properties which can be achieved.

Also, in the case of GB. Patent No. 1,389,539 there is only mention of relatively short discontinuous fibres, i.e. 3 mm, which yield products with inferior impact properties, whilst in the case U.S. Pat. Nos. 4,552,805 and 4,759,985 the degree of control over fibre length is restricted to the natural fibre length distributions which results from the stretch-breaking process.

The principal object of the present invention is to overcome these problems and to provide a method for making composite materials with discontinuous fibre reinforcement which are equivalent in fibre alignment and fibre volume fraction to those based on continuous filament reinforcement.

We have now found that the problems can be overcome by making the composite first with the long continuous filaments and appropriately aligning these, and then—once these filaments are secured in the matrix material—treating this composite so that the length of the filaments can be broken down (severed) in a controlled manner in situ to whatever shorter lengths are desired for further use. This retains the alignment of the fibres to a degree which cannot be attained reliably if the manufacture of the composite starts with the task of embedding short fibres into the matrix material.

Thus according to our invention we provide a method for the manufacture of a composite material of improved mouldability, which comprises subjecting a composite material containing aligned fibre reinforcing material of long length ("continuous filament") embedded within a matrix material to a treatment with means which form discontinuities in the said continuous filaments so that they can be severed into shorter lengths in a controlled and predetermined manner without unduly affecting the matrix material within which the said continuous filaments are embedded.

This allows the alignment to be achieved most easily, using known methods and materials, and for this to be maintained as the length of the continuous filament is reduced.

The starting materials for the process of our present invention may be those well known in the art. For example, the matrix material, the continuous filament material, and the method for forming these into a composite material having the continuous filaments aligned within the matrix material may be any of those known in the art.

One form of starting material comprises the composite in the form of a thin sheet (often referred to in the art as a lamina or "ply") as this form can be easily made and can be used to build up a larger composite mass by combining several such sheets (plies) and bonding them together by their own mutual adhesion or fusion or by use of adhesives. The invention is not limited to this "sheet" form, and other shapes and forms may be used if desired. Such a sheet (ply) or other forms may be based on thermoplastic, pseudo-thermoplastic or thermosetting polymer or resin systems, or a combination thereof, and are commonly referred to in the art as a "prepreg"—i.e. a body (usually a layer or sheet) of the continuous filament material pre-impregnated with the matrix material, especially in a form which is susceptible to bonding with other layers or materials to build up a larger body or product, which may sometimes be described as a "multi-ply" composite or product.

Thus the composite material treated according to the present invention, especially when in sheet form, can be built up and used for the fabrication of larger bodies of composite material or into products. In this, there may be used several sheets of the same material, but sheets of different materials may be used provided they are appropriately compatible and at least one of them is a sheet of composite material according to the present invention. For example one may combine several sheets (or "plies") of substantially the same material of our invention and adjust the direction or orientation of the reinforcement in the various layers as may be desired. Likewise, there may be used layers of other materials (which may be without reinforcement or may contain some different type or form of reinforcement from that of the present invention—for example a layer in which the "continuous filament" reinforcing material has not been severed or shortened).

Further, the method of our invention can be used to make composite materials wherein the fibre length distribution of the aligned discontinuous fibres is substantially uniform throughout or, if so desired, wherein the fibre length distribution of the aligned discontinuous fibres is varied between different parts of the composite material in a specified manner or is limited to those parts of it where the treatment is required.

Thus it can be seen that our invention gives the user a great degree of choice and flexibility in using the treated composites of our invention as starting materials for the manufacture of products of any desired shape or complexity but with excellent control over their properties—even in localised parts of their structure.

The choice of the materials for the composite may be made according to the properties desired, and examples of materials include organic and inorganic reinforcing fibres such as those of carbon, glass, alumina, quartz, metals, and organic polymers for example aramid, etc., and mixtures or combinations thereof. Examples of matrix materials (impregnated materials which serve to bind the fibres) which may be used include organic resins or polymers, such as a thermoplastic resin, e.g. polyolefine, polyester, polyamide, polyetheretherketone, etc., or a partly-cured thermoset resin system e.g. phenolic, epoxy, vinyl-ester, etc. Other matrix materials also suitable for thermo-forming include glasses, metals and metal alloys.

Combinations of various matrix materials may be used if desired, and likewise combinations of reinforcing materials may be used.

The reinforcement material (continuous filament material) used may be any of those conventionally used in the art. Most commonly, it will be in the form of a yarn or bundle of filaments of adequate mechanical properties (strength, durability, etc.) and compatibility with other materials used and the conditions under which the product is eventually intended to be used, but is preferably one comprising substantially twist-free filaments.

The size of the continuous filament material may also be conventional, for example it may have a diameter of 3–12 microns for carbon, 3–20 microns for glass, 20–40 micron for polyethylene and about 12 micron for aramid. These are, of course, only examples and are not to be taken as limiting.

The means which can be used to form discontinuities in the said continuous filaments so that they can be severed into shorter lengths may be any means which imparts energy to the continuous filaments within the matrix material in a highly localised fashion and at sufficient intensity to form the discontinuity. The means used are preferably those which impart the energy as radiant energy.

Examples of suitable energy sources which offer high precision are lasers and electron beam devices, and the like. If lower precision is adequate, ultrasonic radiation or even micro-mechanical treatments may be considered, but these techniques lack the ease of control and quantification of laser or electron beam processes, which are generally preferred. If desired, a combination of means may be used.

These means, for example a laser, can produce very high concentrations of energy in very small areas under a very high degree of control—for example using pulsing techniques. Also, the type of laser can be chosen to emit its energy in a part of the spectrum which is well suited to affect the materials under treatment—so that the energy is of a wavelength which can be absorbed readily by the continuous filament, possibly even preferentially absorbed by it rather than by the matrix material.

A laser has many advantages, including the facility to be able to melt or vaporise the filamentary material (and usually also some of the surrounding matrix material) to form a series or a pattern of very small holes or perforations which affect the filamentary material with minimal damage to surrounding material.

Thus, in choosing a suitable laser to use, the following requirements are important:

(1) the wavelength and beam quality should be suitable for focusing down to the required size of perforation, (2) the wavelength should be chosen to minimise any heat-affected zone associated with the perforation.

(3) pulsed operation must offer adequate pulse power and repetition rate to enable economic processing to be achieved.

Examples of candidate lasers which may be considered include carbon dioxide ($CO_2$), particularly the slow axial flow or "slab" type, Nd YAG, Nd glass and various UV excimer types, etc. In practice, the choice of optimum wavelength will be a compromise depending upon the optical properties of the composite material and the character of the perforations required. Thus, whilst most lasers will be effective in processing carbon fibre composites, which strongly absorb radiation over a wide spectral range, glass fibre composites will be more effectively processed using the 10 micron radiation of a carbon dioxide laser.

Conversely, if a minimised heat-affected zone is of primary importance, there may be advantages in using short wave UV excimer lasers.

The means for producing these effects upon the continuous filament material will usually require not only a source of the energy but also means for directing it appropriately on to the composite being treated.

These means which generate relative movement between the focus of the laser beam and the composite material are required to ensure precise positioning of the three orthogonal axes of perpendicular to and in the plane of the prepreg ply, without which deviations from the desired fibre length distribution will occur. This necessary relative movement will normally involve simultaneous movement of both the composite and the laser focus and for reasons of process economy will require a "perforation on the fly" capability.

The means for positioning the laser focus may be any of those known in the art, such as mechanical or galvo mirror scanning, etc., and combinations of the various methods and/or devices may be used if desired. However, particular attention is necessary to avoid positional deviation in the axis perpendicular to the plane of the prepreg which will result in variable perforation size. For this condition to be fully met, it is desirable that the optical path-length from the laser source to its focus is constant throughout the treatment. Furthermore, the output and pulse frequency of the laser may be varied, if desired, to modify (regularly or otherwise) the pattern of perforations in various parts of the composite under treatment.

The means for positioning the continuous filament prepreg ply will normally allow reel-to-reel continuous processing but other arrangements more suitable for specific product forms may be chosen if they offer economic advantage.

The term "laser" is used here for simplicity of description and should be read as being applicable whatever sources of energy are used, even when they are not strictly conventional lasers.

The discontinuities in the said continuous filaments may be either a complete break or cut in which the length of filament is severed into the desired shorter lengths immediately by the treatment, or may be a localised weakening or degradation of the continuous filament material which is sufficient to allow the filament to remain substantially intact within the matrix but to break easily when the treated composite is subsequently subjected to processing conditions, for example when used to form shaped articles, especially deeply drawn three-dimensional articles, from the composite materials.

Advantageously the procedure of this invention is preferably operated to produce perforations (or holes or zones of weakness) of a size up to 0.50 mm diameter, and especially in the range 0.02 to 0.15 mm diameter, though other sizes may be used if desired. These small diameter perforations are conveniently referred to as "micro-perforations."

The micro-perforations may remain as holes in the composite material being treated, but in some instances may tend to close up to some degree if the matrix material has appreciable flow or similar properties. The main purpose, however, is that the perforations are aimed to provide a sufficient number of points at which the continuous filament reinforcement is attacked and is at least weakened or degraded but most commonly severed. When the continuous filament material is only weakened, this provides sufficient of a discontinuity for the purposes of this invention, as the weakness can then result in the desired break or severance of the filament during subsequent processing.

Alternatively worded, the invention may be described as a method of forming a composite comprising the application of energy in a periodic and highly localised manner (especially as pulses of energy) to a composite reinforced with continuous filament, in such a manner as to cut, break or weaken the filaments and convert them into aligned discontinuous fibres of the required fibre length distribution.

According to a further feature of our invention we also provide new and improved composite materials containing aligned fibre reinforcing material of long length ("continuous filament") embedded within a matrix and severed or separable into shorter lengths in a controlled and pre-determined manner.

We also provide new reinforced composite products derived from a reinforced composite material as described above, and a method for making such products which comprises subjecting the initial treated composite materials to further processing. Such processing may be any convenient procedure or combination of these, but especially by a moulding or forming operation, which consolidates or shapes it, and especially by a thermo-forming operation.

The fibre length distribution of the aligned discontinuous fibres which comprise these new composite materials can be varied to meet the needs of subsequent moulding or shaping operations and will normally involve a spread of fibre lengths from 5 to 100 mm and a range of perforation densities in the region of $2 \times 10^5$ to $5 \times 10^6$ per m$^2$. The precise perforation density used in any particular case will depend upon the size of the perforation used.

The number of filaments which are severed by each perforation will depend, apart from the perforation size, upon the prepreg thickness, its fibre volume fraction and the diameter of the reinforcing filaments, whilst the spatial separation of the perforations in the plane of the prepreg and the alignment distribution of the continuous filament reinforcement around its unidirectional axis will determine the fibre length distribution.

The perforations will also introduce voids into the prepreg, which should be minimised so that the mechanical properties of the ultimate moulded or shaped product are not adversely affected. The potential void levels, in relation to perforation diameter and required fibre length, have been calculated over the range of values relevant to this invention as set out in TABLE 1.

TABLE 1

Calculated Levels of Void Injection Associated with Prepreg Perforation.

| Hole diameter (microns) Discontinuous fiber length (mm) | 10 | 25 | 50 | 100 | 250 | 500 |
|---|---|---|---|---|---|---|
| | | | Calculated void % | | | |
| 200 | 0.004 | 0.010 | 0.020 | 0.040 | 0.100 | 0.200 |
| 100 | 0.008 | 0.020 | 0.040 | 0.080 | 0.200 | 0.400 |
| 50 | 0.016 | 0.040 | 0.080 | 0.160 | 0.400 | 0.800 |

TABLE 1-continued

Calculated Levels of Void Injection Associated with Prepreg Perforation.

| Hole diameter (microns) Discontinuous fiber length (mm) | 10 | 25 | 50 | 100 | 250 | 500 |
|---|---|---|---|---|---|---|
| | | | Calculated void % | | | |
| 25 | 0.032 | 0.080 | 0.160 | 0.320 | 0.800 | 1.600 |
| 10 | 0.080 | 0.200 | 0.400 | 0.800 | 2.000 | 4.000 |

Compared with the 0.5% void level generally accepted for well consolidated continuous filament composites, it is clear from TABLE 1 that the new prepregs with aligned discontinuous reinforcement, which are the subject of the present invention, should present no problems with regard to void content providing care is taken in selecting a perforation diameter which is appropriate for the fibre length required. In practice, broader scope than that indicated by the calculated values may be acceptable because of matrix seepage into the perforations during subsequent prepreg consolidation.

This may be stated alternatively as the provision of a composite comprising a matrix and aligned discontinuous reinforcing fibres which has been derived from a continuous filament reinforced composite of the required material composition by introducing a pattern of highly localised fibre weakness or suitable perforation.

The invention not only overcomes the problems outlined above for the prior art processes but also has the advantage that it allows freedom to choose the discontinuous fibre length distribution which is best suited for subsequent composite shaping requirements and to control the fibre length accordingly.

It also allows the discontinuous fibre length to be varied during the course of the processing, and furthermore allows the presence of discontinuous fibres to be varied throughout the body of the composite, and even localised or restricted to specific areas of the composite material where improved mouldability is required, so that the reinforcement may be a combination of continuous filament and aligned discontinuous fibres.

A further advantage of the invention is that it can be applied to make products made up of multiple plies, and in which the discontinuous fibre length can be varied within or within the various individual plies within a multi-ply laminated structure. This allows a great latitude for variation of the overall structure of a multi-ply composite with a high degree of control. In such multi-ply structures the composition (i.e. the matrix material and the reinforcing fibre) may be varied for different plies and/or within individual plies (e.g. hybridised reinforcement). If desired, a multi-ply composite may be made using a variety of plies, of which all or part may be made by the method of this invention; one or more plies may, if desired, be made by other methods or contain random reinforcement or even no reinforcement at all if this is considered desirable for the final product and its particular intended use.

BRIEF DESCRIPTION OF THE DRAWING

The invention is illustrated but not limited by the accompanying drawings, which are not to scale. In these:

Referring to FIG. 1, a supply of uni-directional composite prepreg (1) is precisely guided by a driven means (2) under a laser head (3) which can move back and forth normal to the direction of the prepreg movement. In this example, a simple mechanical traversing system is used.

The laser emits pulsed radiation which is focused in the plane of the prepreg so that each pulse creates a minute perforation (4) which is normally less than 500 microns in diameter.

The motion of the laser head and the prepreg are programmed by a CNC controller which also controls the pulse width and the peak power of the laser so that any required distribution of perforations can be generated in the prepreg. In this manner, by appropriate programming of the perforations along the prepreg fibre axis the continuous filament reinforcement can be converted as necessary into discontinuous fibres of the required fibre length.

Figure 1:
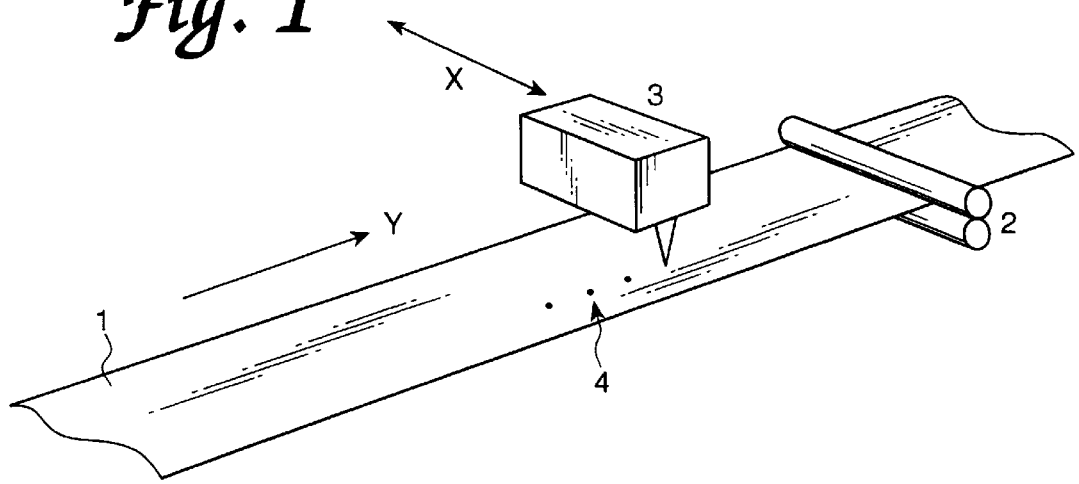
FIG. 1 is a schematic diagram of a perforator for use in the continuous processing of composite materials according to the present invention.
Figure 2:
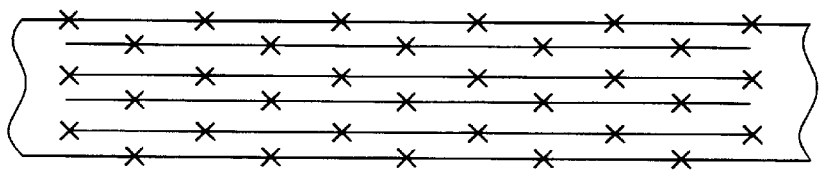
FIGS. 2, 3 and 4 are diagrammatic representations of composite material samples which have been subjected to three of the many possible variants of the perforation process.
Figure 3:
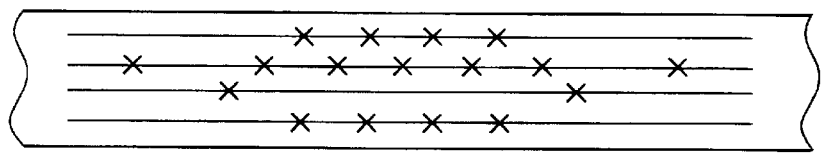
Figure 4:
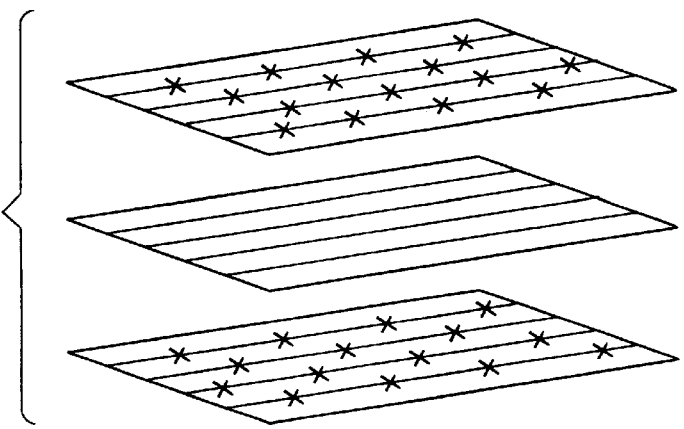

An indication of the wide range of treatments which can be achieved by laser perforation is illustrated in FIGS. 2, 3 and 4.

In FIG. 2, an example is shown of a single ply prepreg which has been converted by laser perforation into an aligned discontinuous fibre composite which has a consistent fibre length distribution throughout the sample material.

In FIG. 3 an example is shown of a single ply prepreg which has been converted by laser perforation into an aligned fibre composite with partly continuous aligned filament and partly discontinuous aligned fibre reinforcement of variable fibre length.

In FIG. 4 an exploded diagram is shown of a multi-ply laminate which has a central ply reinforced with continuous filaments and upper and lower plies reinforced with aligned discontinuous fibres.

The present invention is also illustrated but not limited by the following example, which describes a procedure of operation.

EXAMPLE

A Photon Versa-Lase V505 $CO_2$ laser (Photon Sources Inc.) was focused to a 50 micron diameter spot using a 28 mm GaAs lens of 63.5 mm focal length. The laser pulse width and peak power were controlled by an Anorad Anomatic III CNC controller which was also fitted with an "on the fly" interface so that the laser could be pulsed at pre-programmed positions of the controller's XY stage on which a 75×500 mm sample of APC-2 PEEK/AS4 carbon fibre prepreg (ICI Fiberite) was mounted.

Using a pulse width of 100 micro-seconds, a peak power of approximately 1250 watts, and a traverse speed of 250 mm/second, the prepreg was perforated with 50 micron diameter holes to convert the continuous filament carbon fibre into aligned discontinuous fibre lengths of 100 mm. length.

For this purpose, the XY co-ordinates (mm) of the line origins within the pattern repeat were as follows (Table 2, below):

TABLE 2

Positional Co-ordinates of Perforation.

| line | x | y | line | x | y | line | x | y | line | x | y |
|---|---|---|---|---|---|---|---|---|---|---|---|
| 1 | 0.0 | 0.0 | 11 | 1.0 | 25.0 | 21 | 1.95 | 50.0 | 31 | 0.95 | 75.0 |
| 2 | 0.1 | 2.5 | 12 | 1.1 | 27.5 | 22 | 1.85 | 52.5 | 32 | 0.85 | 77.5 |
| 3 | 0.2 | 5.0 | 13 | 1.2 | 30.0 | 23 | 1.75 | 55.0 | 33 | 0.75 | 80.0 |
| 4 | 0.3 | 7.5 | 14 | 1.3 | 32.5 | 24 | 1.65 | 57.5 | 34 | 0.65 | 82.5 |
| 5 | 0.4 | 10.0 | 15 | 1.4 | 35.0 | 25 | 1.55 | 60.0 | 35 | 0.55 | 85.0 |
| 6 | 0.5 | 12.5 | 16 | 1.5 | 37.5 | 26 | 1.45 | 62.5 | 36 | 0.45 | 87.5 |
| 7 | 0.6 | 15.0 | 17 | 1.6 | 40.0 | 27 | 1.35 | 65.0 | 37 | 0.35 | 90.0 |
| 8 | 0.7 | 17.5 | 18 | 1.7 | 42.5 | 28 | 1.25 | 67.5 | 38 | 0.25 | 92.5 |
| 9 | 0.8 | 20.0 | 19 | 1.8 | 45.0 | 29 | 1.15 | 70.0 | 39 | 0.15 | 95.0 |
| 10 | 0.9 | 22.5 | 20 | 2.9 | 47.5 | 30 | 1.05 | 72.5 | 40 | 0.05 | 97.5 |

A unidirectional laminate consisting of four such perforated plies was consolidated according to the procedure laid down in ICI Fiberite APC-2 Data Sheet 2, and compared with a four-ply unidirectional laminate produced under similar conditions from un-perforated plies derived from the same batch of APC-2. Standard tensile tests according to ASTM Test D-3039 were carried out on 12.5 mm wide and 150 mm gauge length samples cut from the thin laminate sheets which gave the following results:

TABLE 3

Tensile Property Data.

| 0 degrees. | APC-2 continuous filament | % C of V | APC-2 100 mm aligned discontinuous fibre | % C of V |
|---|---|---|---|---|
| Tensile strength (MPa) | 1896 | 10.5 | 1926 | 1.2 |
| Tensile strength (GPa) | 128 | 8.0 | 130 | 9.7 |

From these results it may be concluded that the laser perforation does not materially affect the mechanical properties of the APC-2 while enabling it to be drawn at high temperature with a resulting improvement in its moulding properties.

Although this invention has been described with reference to a particularly preferred embodiment, those skilled in the art will recognise that variations may be made in the method of the invention and in the composition of the resulting products.

I claim:

1. A method for the manufacture of a composite material of improved mouldability which comprises providing a composite material containing aligned continuous filaments embedded within a matrix material; and applying energy by laser to said composite material in a periodic and localized manner to thereby form discontinuities as a pattern of microperforations, in said continuous filaments so that they can be severed into shorter lengths in a controlled and pre-determined manner without unduly affecting the matrix material within which the said continuous filaments are embedded, said laser application producing microperforations in said filaments which have a diameter of less than 0.50 mm.

2. A method as claimed in claim 1 wherein the discontinuities are produced by the application of laser pulses of energy in a periodic and highly localised manner to the composite reinforced with continuous filament, to cut, break or weaken the filaments so as to allow their conversion into aligned discontinuous fibres of the required fibre length distribution.

3. A method as claimed in claim 1 or claim 2 wherein the laser energy is applied in a pattern to determine the resulting fibre length distribution of the aligned discontinuous fibres.

4. A method as claimed in claim 1 wherein the laser is a carbon dioxide ($CO_2$) laser of the slow axial flow type.

5. A method as claimed in claim 1 wherein the applied energy is varied during the course of the treatment to produce different specified fibre-length distributions in different parts of the composite material being treated or to limit treatment to specific parts of the composite material.

6. A method for making a composite material as claimed in claim 1 wherein the composite material being treated is in sheet form.

7. A method for making a composite material as claimed in claim 1 wherein the matrix material is a metal, alloy, glass or a combination thereof.

8. A method for making a composite material as claimed in claim 1 wherein the continuous filament material is substantially twist-free.

9. A method as claimed in claim 1 wherein the fibre-length distribution of the aligned discontinuous fibres is substantially uniform throughout.

10. A method as claimed in claim 1 wherein the matrix material comprises a thermoplastic, or thermosetting polymer or resin or a combination thereof.

11. A method as claimed in claim 1 wherein the applied energy produces micro-perforations of a diameter in the range 0.02 to 0.15 mm.

12. A method as claimed in claim 1 which includes the further step of thermo-forming said composite material.

13. Composite material comprising aligned continuous filament as reinforcing material embedded within a matrix and severed or separable into shorter lengths in a controlled and pre-determined manner, said composite being made by the method of claim 1.

14. A composite material as claimed in claim 13 wherein the continuous filament reinforcing material is weakened locally by discontinuities made therein sufficient to allow the continuous filament to break when subsequently subjected to moulding.

* * * * *